J. T. McGRATH.
TRAVELING SHEARS.
APPLICATION FILED DEC. 22, 1910.

997,686.

Patented July 11, 1911.

6 SHEETS—SHEET 1.

WITNESSES:

INVENTOR:

J. T. McGRATH.
TRAVELING SHEARS.
APPLICATION FILED DEC. 22, 1910.

997,686.

Patented July 11, 1911.
6 SHEETS—SHEET 6.

UNITED STATES PATENT OFFICE.

JOHN THOMAS McGRATH, OF BATTLE CREEK, MICHIGAN.

TRAVELING SHEARS.

997,686.

Specification of Letters Patent.  Patented July 11, 1911.

Application filed December 22, 1910. Serial No. 598,864.

*To all whom it may concern:*

Be it known that I, JOHN THOMAS Mc-GRATH, of Battle Creek, in the county of Calhoun and State of Michigan, one of the United States of America, have invented certain new and useful Improvements in Traveling Shears; and I hereby declare that the following is a full, clear, and exact description of the same.

The object of my invention is to provide a metal shearing machine with an intermittently traveling shear blade, and with means for actuating it.

For an understanding of the invention, reference is to be had to the following description and to the accompanying drawings in which:—

Figure 1:
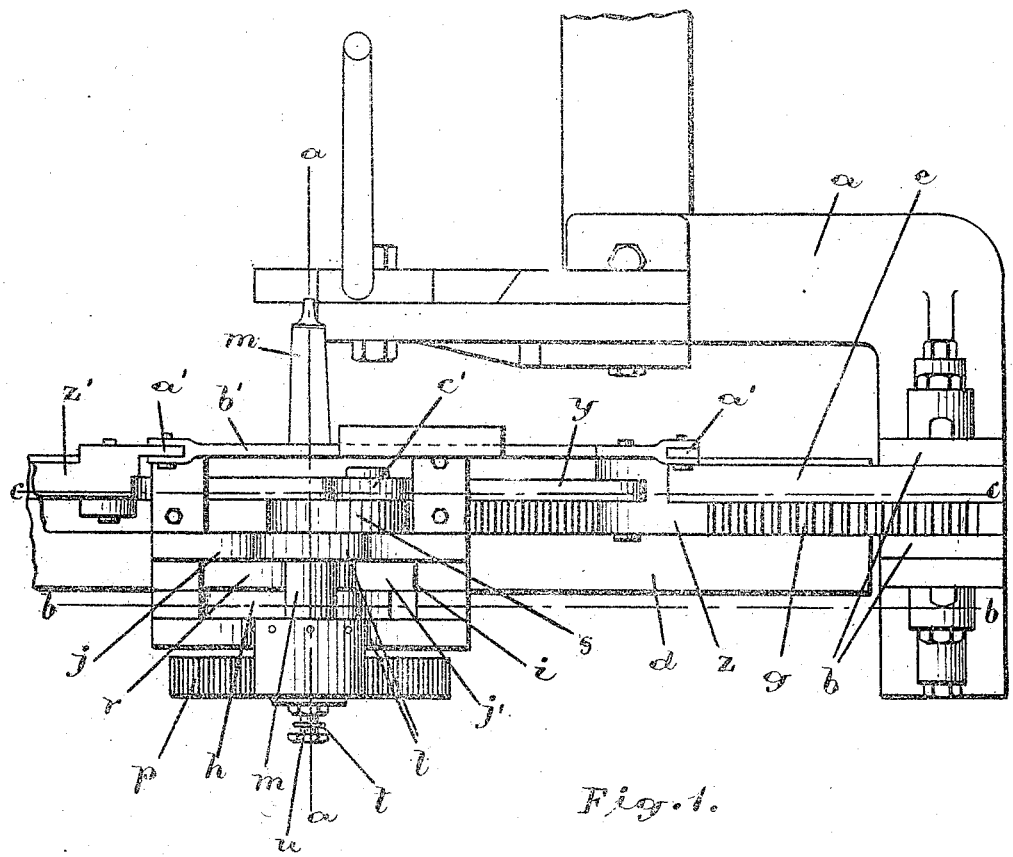
Figure 2:
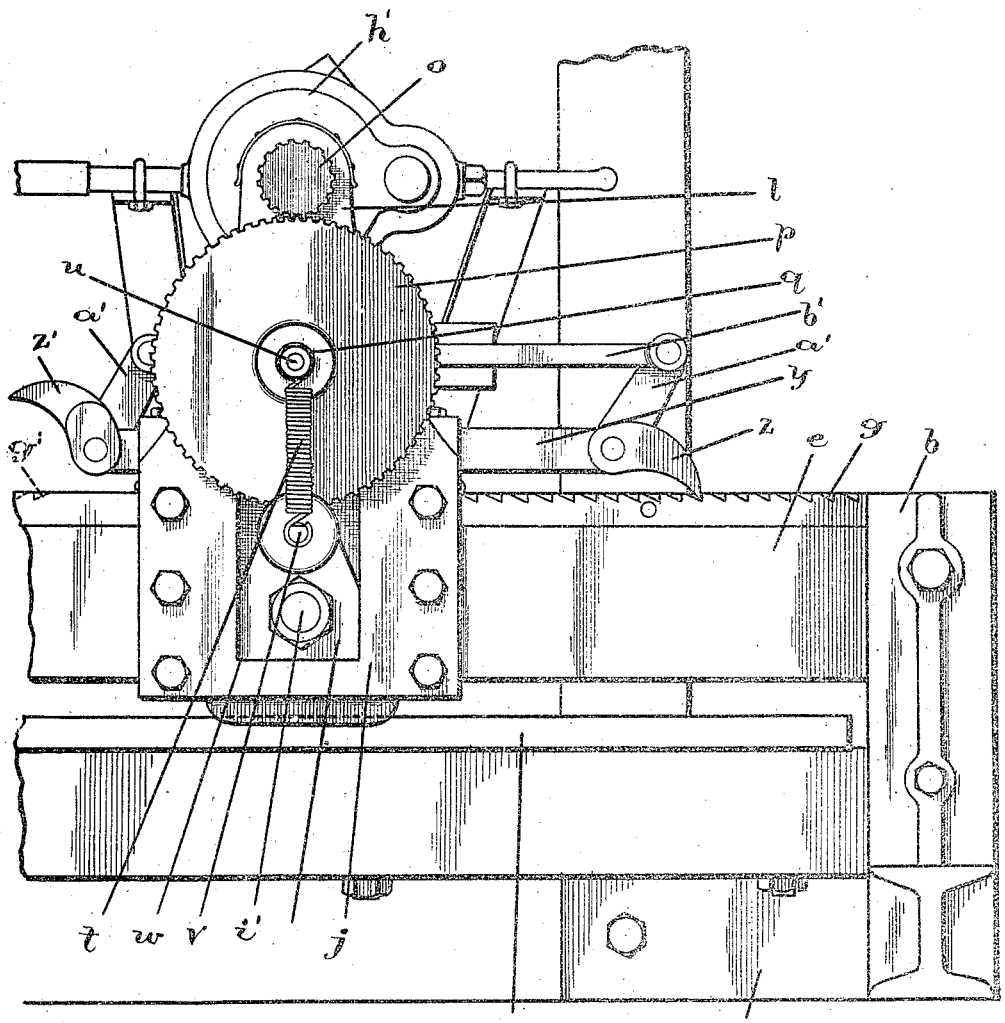
Figure 3:
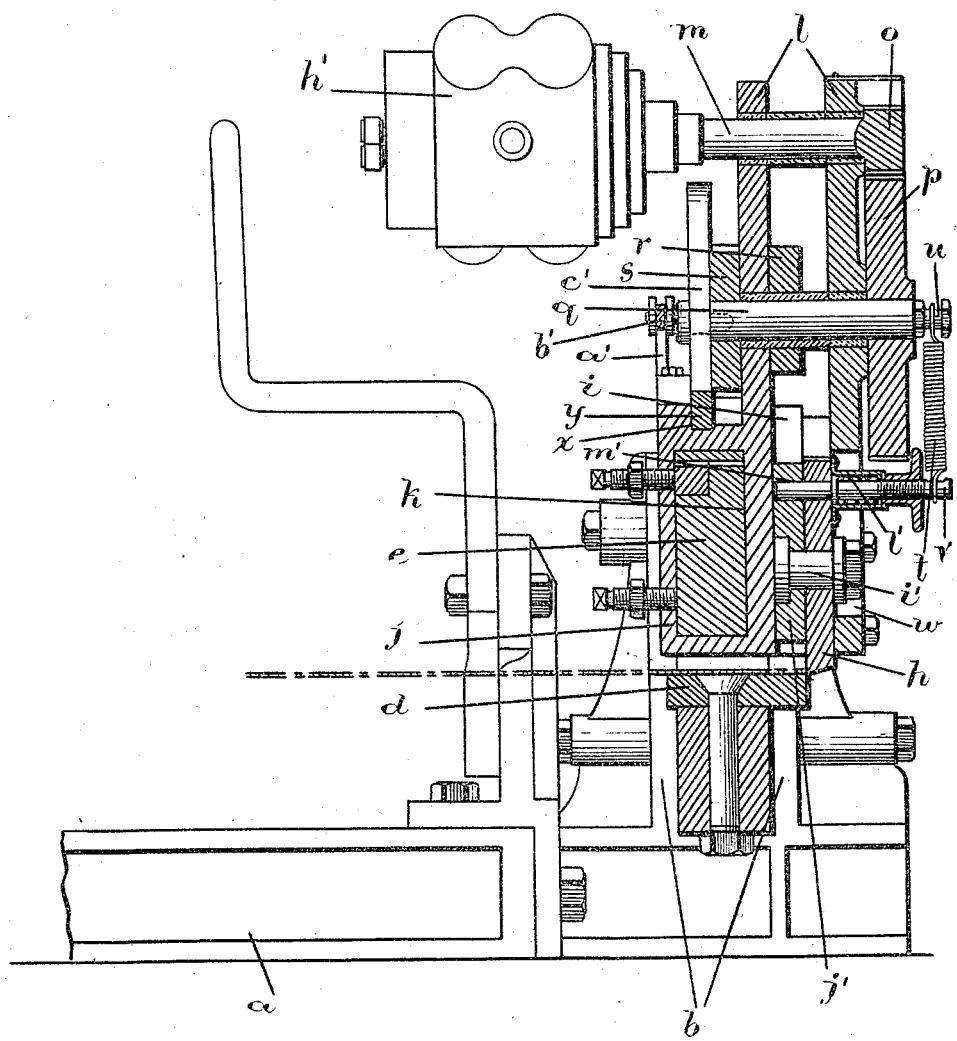
Figure 4:
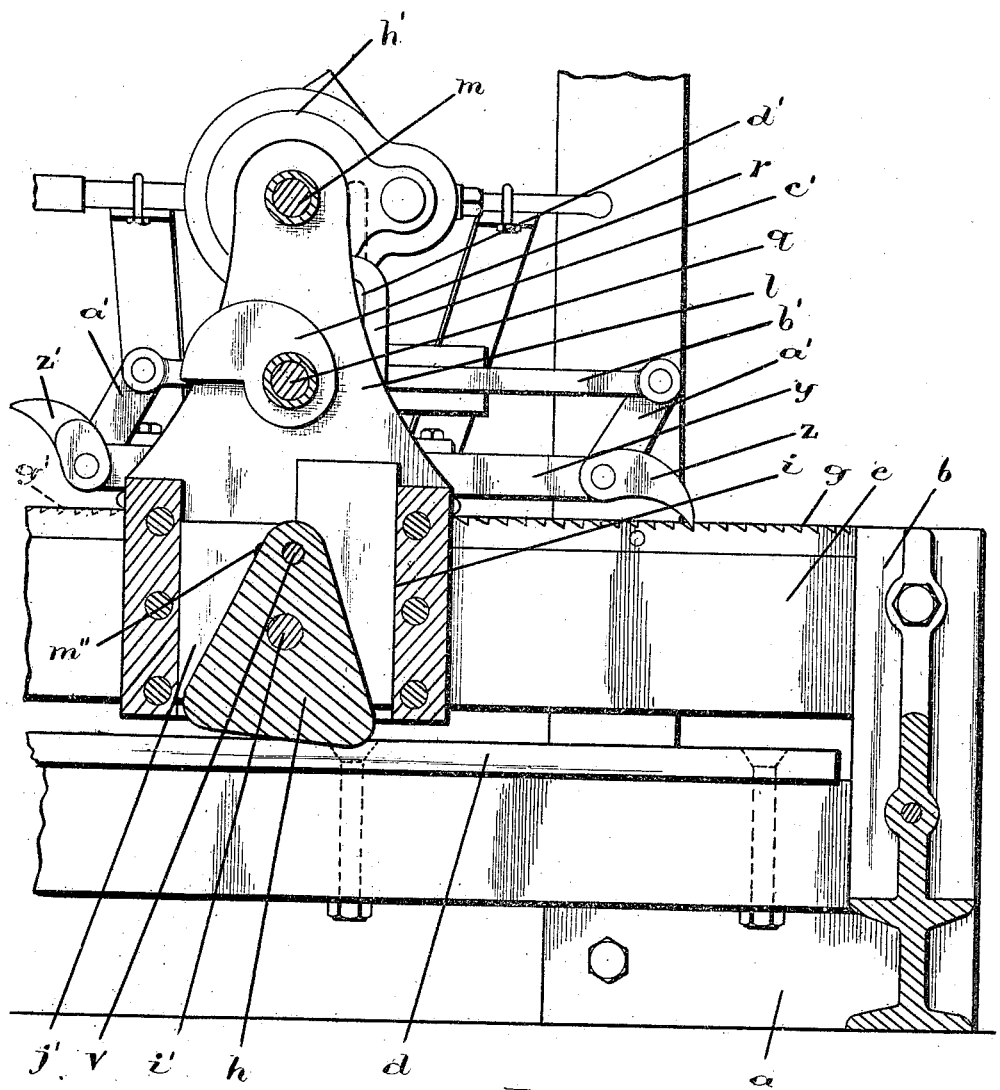
Figure 5:
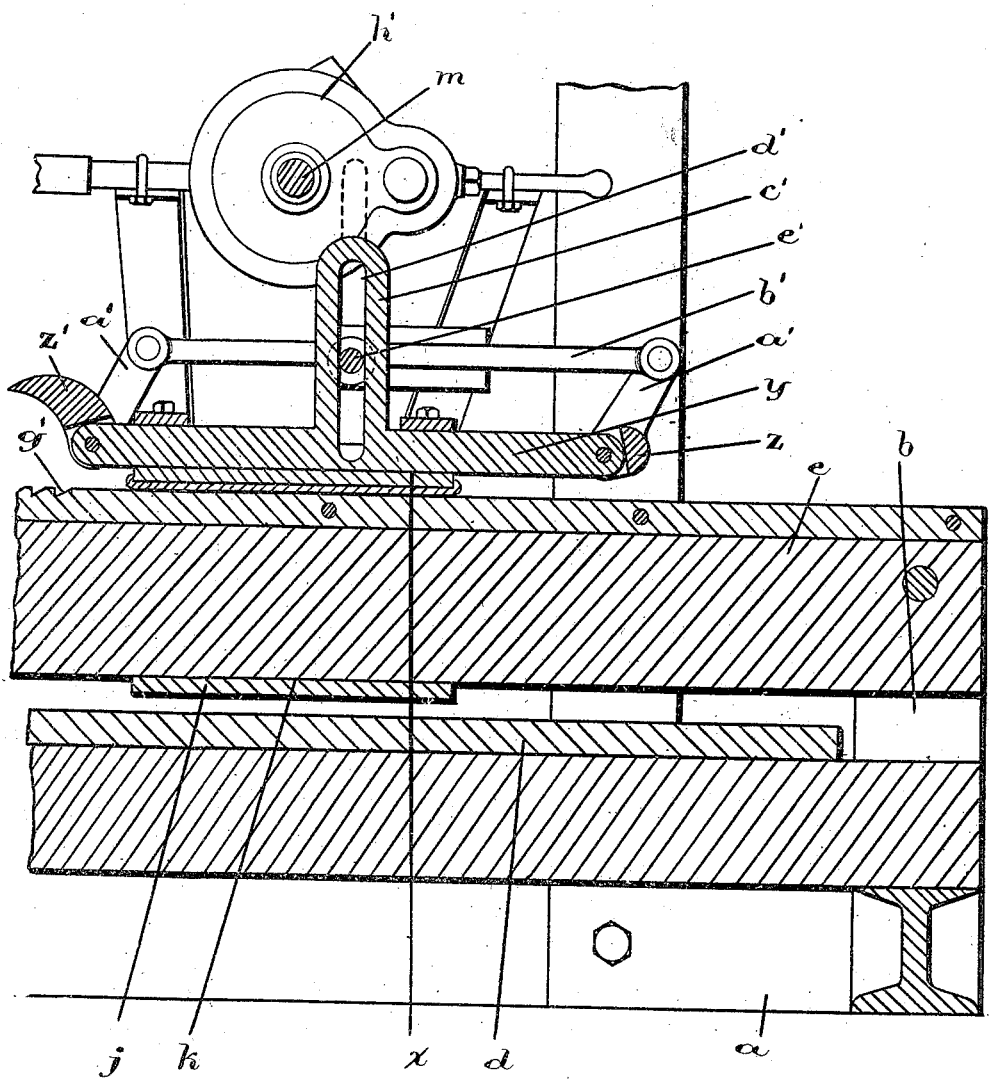
Figure 6:
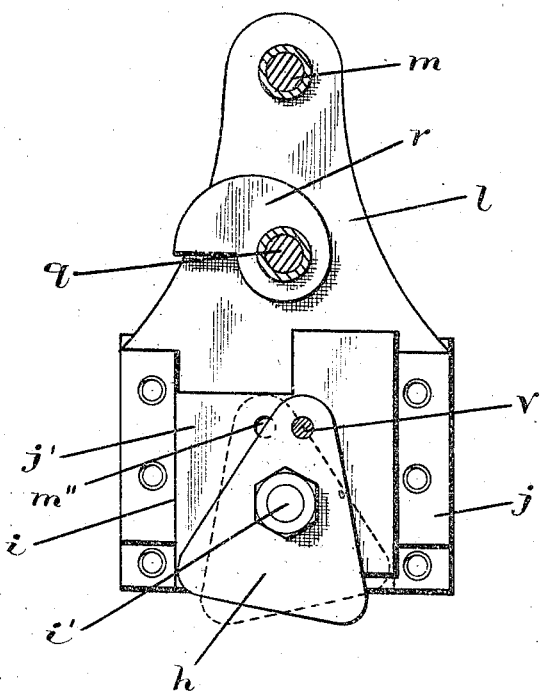
Figure 7:
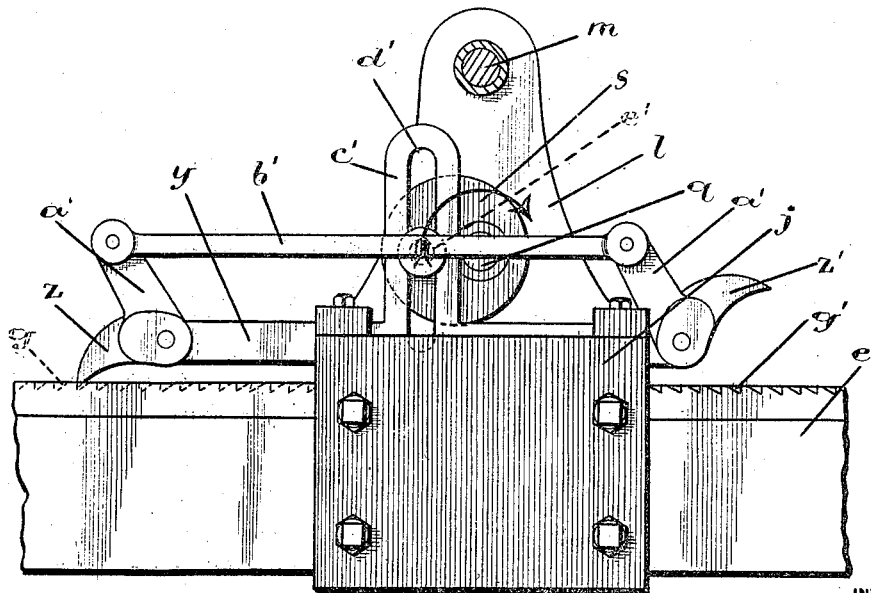

Figure 1, is a plan view of the shearing machine. Fig. 2, is a front elevation of the same. Fig. 3, is a section on the line $a$—$a$ Fig. 1. Fig. 4, is a section on the line $b$—$b$ Fig. 1. Fig. 5, is a section on the line $c$—$c$ Fig. 1. Fig. 6, is an elevation of the traveling shear blade, carriage and actuating mechanism, and, Fig. 7, is a detail view of the propeller mechanism and carriage, looking at them from the opposite side to Fig. 6.

Like characters of reference refer to like parts throughout the specification and drawings.

At the sides of the main frame $a$ are standards $b$ supporting the stationary shear blade $d$ and the carriage rail $e$. Opposed to the stationary shear blade $d$ is the traveling shear blade $h$ slidable in vertical guideways $i$ in the carriage $j$. The carriage is provided with a horizontal slideway $k$ for the carriage rail $e$ along which it travels during the operation of the machine, the motion of the carriage being intermittent to provide a period of rest during which the traveling shear blade $h$ is actuated to sever the material as hereinafter described.

The carriage $j$ is provided with standards $l$ in the top of which is journaled the motor shaft $m$ fitted with a pinion $o$, the pinion meshing with the spur wheel $p$ fixed on the driving shaft $q$, and causing its revolution and the rotation of the cam $r$ and eccentric $s$. The cam $r$ is fixed on the driving shaft $q$ to effect the movement of the traveling shear blade $h$, as the shaft $q$ revolves, and force its cutting edge past the cutting edge of the stationary shear blade, the cam then instantaneously effecting the release of the traveling shear blade so that it can return to its normal or inoperative position under the influence of the spring $t$. One end of the spring is suspended from a pin $u$ at the end of the driving shaft $q$, and the other end is connected to a pin $v$ projecting from the traveling shear blade $h$, a slot $w$ being provided in the carriage $j$ for the vertical movement of the pin $v$ as the traveling shear blade descends under the influence of the cam, and rises under the influence of the spring.

The carriage $j$ is provided with guideways $x$ parallel with the carriage rail $e$, and slidable in the guideways $x$ is a propeller bar $y$. Pivoted to the ends of the propeller bar $y$ are detent dogs $z$ $z'$ engaging respectively with racks $g$ $g'$, secured to the carriage rail $e$. The detent dogs $z$ $z'$ are each provided with an arm $a'$ the arms being connected by a link $b'$ and so arranged that when the link is moved in one direction, it brings the detent dog $z$ into operative and the detent dog $z'$ into inoperative, relation with its rack, and when moved in the other direction, brings the detent dog $z'$ into operative, and the detent dog $z$ into inoperative, relation with its rack.

The propeller bar $y$ is provided intermediate its ends with a vertical arm $c'$ having an elongated slot $d'$, and working in the slot $d'$ is a roller $e'$ for the eccentric $s$. The eccentric is fixed on the driving shaft $q$ and during its revolution causes the roller $e'$ to revolve around the driving shaft, the roller moving the arm $c'$ forward to a position in front of the driving shaft $q$ and then bearing against it to push the carriage forward on its travel. For example, when the traveling shear blade is moving to the left, the detent dog $z$ is in engagement with the teeth of the rack g, and the detent dog z' is out of engagement with its rack. The motor h' causes the revolution of the motor shaft m, and pinion o, and the pinion meshing with the spur wheel causes the revolution of the driving shaft q, cam r, and eccentric s, the cam r being timed to actuate the traveling shear blade h while the eccentric roller is positioning the propeller bar for the advancing movement of the carriage.

The revolution of the eccentric, as shown in Fig. 5, causes the roller e' to travel in the direction indicated by arrow, that is to say during the first quarter of its revolution around the driving shaft, the roller ascends on a forward arc rising in the slot d' moving the arm and propeller bar forward, the forward movement continuing until the roller completes the second quarter of its revolution. This brings the vertical arm c' from a position in rear, to one in front, of the driving shaft q, and moves the propeller bar forward a corresponding distance, the dog z then dropping by gravity into engagement with a tooth of the rack g to prevent the reverse movement of the propeller bar as the roller continues its revolution around the driving shaft. During the second half of its revolution, the roller pushes against the arm a', detained in its fixed position by the detent dog z, and advances the traveling carriage the same distance the propeller bar was advanced. The traveling shear blade is then actuated to cut the material, and while this is taking place the eccentric roller is moving the propeller bar to take up a new position for the next advance of the carriage.

When the carriage is moving to the right, the detent dog z' engages with the rack teeth g', the detent dog z then being out of engagement with the rack teeth g, the action of the parts being the same as previously described.

The traveling shear blade h is reversible so that it can cut when moving either to the right or to the left, and for this purpose is mounted on a stud i' projecting from the sliding member j' movable in the vertical guideways i.

The pin v is slidable through the traveling shear blade into either of the holes m' m'' in the sliding member j', and yieldingly holding it in its selected hole is a spring l'.

In the operation of the machine, the material to be cut is fed across the top of the stationary shear blade d. The motor h' is then started to rotate the motor shaft m and pinion o. The revolution of the pinion o revolves the spur wheel p, driving shaft q, cam r, and eccentric s, the cam actuating the traveling shear blade, and the eccentric actuating the propelling means for the carriage, the actuation of the cam alternating with that of the eccentric, so that while the traveling shear blade is operating to cut the material, the carriage will be at rest, and while the traveling shear blade is at rest, the carriage will move to a new position for the succeeding cut.

Having thus fully described my invention what I claim as new and desire to secure by Letters Patent is:—

1. In a shearing machine, a traveling shear blade, a stationary shear blade of greater length than the traveling shear blade, operable means intermittently moving the traveling shear blade along the stationary shear blade, and operable means actuating the traveling shear blade.

2. In a shearing machine, a carriage, a traveling shear blade mounted in the carriage, a stationary shear blade of greater length than the traveling shear blade, operable means intermittently moving the carriage and traveling shear blade along the stationary shear blade, and operable means actuating the traveling shear blade.

3. In a shearing machine, a stationary shear blade, a carriage, a traveling shear blade mounted in the carriage, means for reversibly holding the traveling shear blade, means for moving the carriage, and means for actuating the traveling shear blade.

4. In a shearing machine a stationary shear blade, a carriage rail, a rack for the carriage rail, a carriage movable on the carriage rail, a propeller bar slidably held by the carriage, a detent dog pivoted to the propeller bar and engaging with the rack, a slotted arm for the propeller bar, a driving shaft, an eccentric for the driving shaft, a roller for the eccentric working in the slotted arm, a traveling gear blade held by the carriage, and means for actuating the traveling shear blade.

5. In a shearing machine, a main frame, a stationary shear blade, a carriage rail, a rack for the carriage rail, a carriage movable on the carriage rail, a propeller bar slidably held by the carriage, detent dogs pivoted to the propeller bar, a link connecting the detent dogs to move them into and out of operative relation with the rack, a slotted arm for the propeller bar, a driving shaft journaled in the carriage, an eccentric mounted on the driving shaft, a roller for the eccentric operating in the slotted arm to intermittently move the propeller bar, a cam for the driving shaft, and a traveling shear blade held by the carriage and actuated by the cam.

6. In a shearing machine, a main frame, a stationary shear blade, a carriage rail, a rack for the carriage rail, a carriage movable on the carriage rail, a propeller bar slidably held by the carriage, detent dogs pivoted to the propeller bar, a link conecting the detent dogs to move them into and out of operative relation with the rack, a slotted arm for the propeller bar, a driving shaft journaled in the carriage, an eccentric mounted on the driving shaft, a roller for the eccentric operating in the slotted arm to intermittently move the propeller bar, a cam for the driving shaft, a traveling shear blade held by the carriage and actuated by the cam, and means for restoring the traveling shear blade to an inoperative position when released by the cam.

Battle Creek, December 10th, 1910.

JOHN THOMAS McGRATH.

Signed in the presence of—
 Thomas J. Taylor,
 Jno. B. Livingston.